June 22, 1937.    G. E. LUCE    2,084,351
FILTER BED DRAINAGE CONDUIT
Filed Sept. 16, 1935
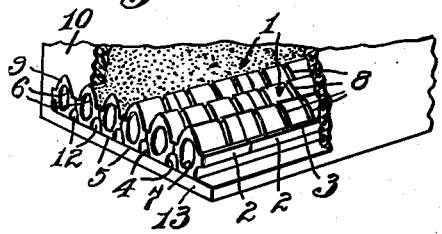
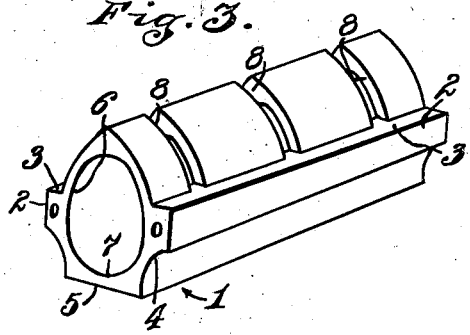
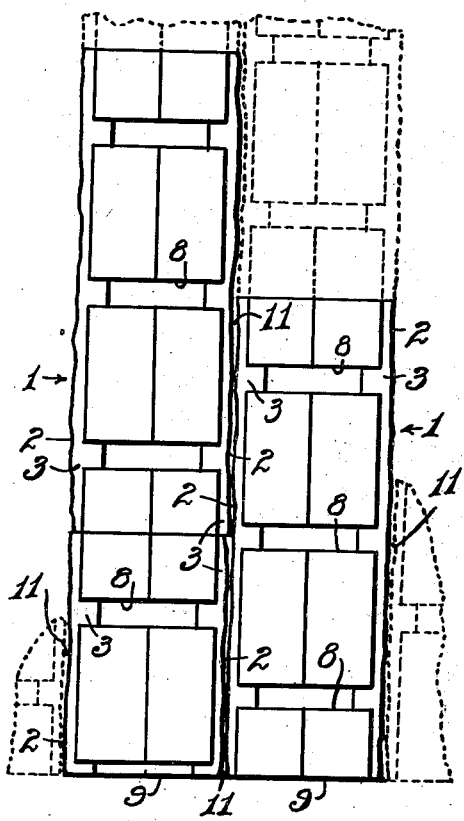
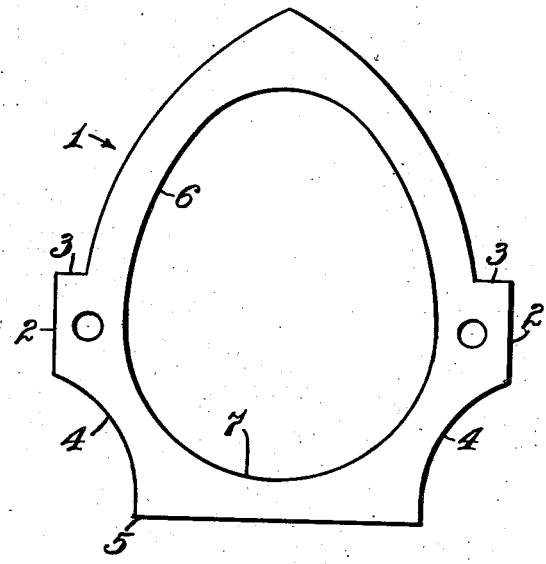
INVENTOR.
Grafton E. Luce,
BY
Hood & Hahn
ATTORNEYS Patented June 22, 1937

2,084,351

UNITED STATES PATENT OFFICE 2,084,351

FILTER BED DRAINAGE CONDUIT

Grafton E. Luce, Brazil, Ind.

Application September 16, 1935, Serial No. 40,673

21 Claims. (Cl. 210—148)

My invention relates to improvements in sewage disposal blocks or conduits and more particularly to an improvement in a block adapted for use in sewage disposal plants, filtering beds and places of like character.

In sewage disposal plants and in filtering beds, it is customary to provide at the bottom of the bed a series of drainage conduits with openings through their upper walls to permit the drainage of water thereinto. These conduits are covered with suitable filtering material generally in the form of stone or aggregate which forms the filtering beds and through which the water passes before entering the conduits.

One of the objects of my invention is to provide a drainage conduit for use in connection with the above type of bed which will provide for the greatest possible inflow of water and by its special skew back construction formed between conduits, cause the aggregate to arch over the conduit and especially over the openings through the conduit so that there will be the minimum danger of the walls of the conduit between openings becoming broken by the weight of aggregate or covering, and this concentration of weight and pressure being divided between conduits will hold them to a level structure and prevent slippage and disarrangement.

Another object of my invention is to provide a conduit of such shape and having the openings so arranged as to insure a free flow of water into the conduit and at the same time offer the least resistance to the flow of air through the filter bed.

Another object of my invention is to provide a conduit whereby cleaning of the filtering bed in and between conduits may be effected without removing the filtering aggregate or the conduits.

Another object of my invention is to provide a conduit of such shape and having the openings so located as to insure a level water surface near the center of the conduit leaving the upper part of the opening free for the air flow.

Another object of my invention is to provide a hand hold in the balanced center either way of the conduit so that it can be handled with one hand.

For the purpose of disclosing my invention, I have illustrated an embodiment thereof in the accompanying drawing in which:

Fig. 1 is a perspective view, partly in section, illustrating a filtering bed with my conduit in position;

Fig. 2 is a plan view of a number of conduit sections arranged in position;

Fig. 3 is a perspective view of a conduit section embodying my invention; and

Fig. 4 is an end view of the same.

In the embodiment of the invention illustrated the filter bed is provided with a plurality of conduits preferably formed in sections. As shown in Fig. 3, each section 1 takes the shape in cross section of a parabola shaped arch inside and hyperbola shape outside. Along each side of the exterior of this arch shaped conduit, I provide a shoulder 2, flat, on its upper side as at 3 and the underside of this shoulder and a portion of the conduit proper is given a reverse curve as at 4. The bottom of the conduit is flat as at 5 to provide a substantially flat base for the conduit. The interior of the section takes the form of a parabola arch as at 6, with the exception that the bottom of the opening is rounded as at 7, much like an axial cross section of a hen's egg, small end up.

At suitable intervals throughout the length of the conduit, openings 8 are formed through the wall above the shoulder and these openings extend to the top surface 3 of the shoulder 2. These openings 8 may be made any width desirable, although I have found that effective results are obtained by making the area of the openings forty percent of the horizontal area of the conduit.

In use, the conduit sections are laid end to end throughout the length of the filter bed with one end 9 projecting through the end wall 10 of the bed as illustrated in Fig. 1. A series of such rows is laid, side by side, with the shoulders 2 abutting the shoulder of the next adjacent row and with the opening 8 of one row staggered with respect to the openings of the next adjacent row.

Due to the fact that the conduit sections are preferably formed of clay, the structure, especially the sides thereof, are not absolutely true and as a result slight interstices 11 occur between the abutting shoulders 2 of the adjacent tiles and the end joints. This leaves communications with the conduits 12 formed as a result of the reverse curve 4 in the side walls of the conduit beneath the shoulders 2 particularly as illustrated in Fig. 1 providing a drainage.

After the conduits have been all arranged in the bottom of the filter or disposal bed, they being merely placed in position on the concrete base, the filter aggregate is filled in on top of the same until a suitable depth of aggregate is provided.

Due to the shape of the interior opening of the conduit, minimum obstruction to the flow of water therethrough occurs and due to the peculiar shape of the arch of the conduit and the arrangement of the shoulders or skew back 2 on each side thereof, arching of the aggregate above the bed and above the conduit, is insured so that the crushing effect of the heavy load of aggregate comprising the bed, is minimized. As a matter of fact, a greater proportion of this load is carried between conduits on the shoulders or skew back 2 with some slight side thrust against the sides of the arch and with a minimum of down thrust on the top of the arch. This results in a more even distribution of the load on the conduit. As a matter of fact, due to the structure of the conduit, very little water flows directly down the top of openings 8. The greater portion of the water will strike the top of the arch, flowing down the sides of the arch and then along the flat top of the shoulder 2 and into the base of openings, thus leaving the top of the opening free for the escape of air from and through the conduit.

Another advantage to be obtained by the construction of the conduit as illustrated, is that by the arrangement of the reverse curve 4 beneath the shoulder 2 when the conduits are laid side by side, a supplementary or a series of supplementary conduits 12 is provided, through which the silt may drain to the bottom 13 of the filter and out, so that, by flushing water through these drainage conduits 12 from one end to another, any accumulated silt may be readily washed out and thus prevented from accumulating in the filter bed to decay and contaminate the water.

Furthermore, due to the fact that the openings or interstices 11 occur between the shoulders 2 thus permitting the dropping of the silt into conduits 12, by stopping up the conduits at one end and reversing the flow of water through these conduits, the water being under pressure, the entire filter bed may be flushed out and cleansed by agitating the accumulated silt in the bed so that when the reverse flow is stopped, this silt may drain out through the conduits.

By the above construction, it will be seen that I provide a secondary opening between the conduits so that the spaces between the conduits may be flushed for the purpose of cleaning. These openings or secondary conduits also provide additional drainages through which the water may drain to the concrete bed and thence out of the bed.

Furthermore, it will be noted that by providing the openings in the top wall of the conduit, pointing the top of the conduit and staggering these openings, when the conduits are laid side by side, the travel of the water to a discharge opening as it drains down from the top of the conduit, is minimized, whereby an equal flow of the water may be obtained and due to the fact that the greater portion of the water flows into openings at the base thereof, there will be no obstruction to the passage of air through the openings and the flow of water will be maintained free at all times and with a level surface.

Furthermore, due to the staggered relation of the openings in the top of the arched conduit and due to the fact that there is a minimum travel of the water before entering a conduit, and due to the fact that the water may flow into a number of conduits at substantially the same time, as a result of the structure heretofore described, the water level of the bed is maintained substantially constant and the danger of one conduit or a number of the conduits becoming overflowingly full before the water will drain into other conduits, is eliminated.

It will be noted that in the structure illustrated, a center opening in the conduit section is arranged equidistant between the two ends of the conduit. This opening in actual practice is generally made at least sufficiently wide for the insertion of the fingers of the handler therein. By the positioning of the center opening equidistant from the two ends, the handler of the conduit section may pick the same up by inserting his fingers in this opening and the section will be substantially balanced.

Furthermore, the two ends of the section are squared and have no slots or notches therein. As a result, when the section, being formed of clay, is set on end to be passed through drying rooms or kilns, it will stand up straight and will have no tendency to tilt from one side to the other.

It will be noted that the external cross section of my improved block, above the plane of shoulder 3 is such that, when the filter aggregate has settled thereon and on the shoulders 2, the contour of the bottom of the aggregate will be a series of self sustaining arches having minimum-width bases. It will also be noted that the upper external surfaces, above shoulders 3, offer no portions upon which sediment may collect against normal water flow, and that, as the cross-slots 8 extend down to shoulders 3 and said shoulders are comparatively narrow and freely drainable by reason of the provision of freedom of water flow between adjacent surfaces 2 and the said cross-slots 8, the possibility of accumulation of silt which cannot be readily flushed out is reduced to a minimum.

An additional advantage to be obtained by the construction of my conduit is that of insuring an adequate flow of air through the sewerage and through the conduit. It has been maintained by sewerage handling engineers that the only appreciable amount of air passing through the aggregate forming the sewerage bed is that which is carried down into the aggregate by the water spray during the time of the spraying of the sewerage. This spray occupies only about one-fourth to one-third of the total time consumed in the passage of the sewerage through the aggregate and during the rest of the time there is practically no air passed down through the sewerage bed.

By the construction of the conduit as disclosed in my present application, practically only the lower part of the conduit contains water, the upper part forming a passage for the air which is unobstructed by the flow of the water through the conduit. As a result, there is ample room above the outflowing water for the passage of air through the conduit and up into the aggregate, this air being delivered up through the various outlet openings and due to the shape of these openings, they more or less form baffles to cause an upflow of air from out of the conduit into the aggregate. This upflow of air may be increased by draining through both ends of the conduit. If a drainage is provided through both ends of the conduit bed, the conduits and bed can be more easily washed out through the wash out openings 12 as the washing can be done from either end of the bed. It is understood, of course, that when the conduits are laid, they are given a slight down-hill inclination to insure the outflow of the water.

I claim as my invention:

1. A hollow drainage conduit having an external shape in cross section substantially that of a hyperbola arch outside and a parabola arch inside said arches diverging toward the top of the conduit and transversely extending slots in the upper portion of said conduit.

2. A hollow drainage conduit having a shape in cross section substantially that of a hyperbola arch outside and parabola arch inside, said arches diverging toward the top of the conduit shoulders extending from the sides of said conduit intermediate of its top and bottom, and having openings formed in the top of the arch above said shoulders.

3. A hollow drainage conduit comprising a perforated upper arch in cross section substantially that of a hyperbola arch outside and a parabola arch inside, said arches diverging toward the top of the conduit the interior of the base below said arch being rounded.

4. A hollow drainage conduit comprising an upper arch in cross section substantially that of a hyperbola arch outside and a parabola arch inside, said arches diverging toward the top of the conduit the interior of the base below said arch being rounded, lateral shoulders formed on the exterior of said arch intermediate of its top and bottom, and transverse slots through the top of said arch above said shoulders.

5. A hollow drainage conduit having the shape in cross section substantially that of a hyperbola arch outside, the interior of the base below said arch being a rounded concave, upwardly presented lateral shoulders formed on each side of the exterior of said conduit intermediate of its top and bottom, and slots formed through said arch terminating at said shoulders.

6. A hollow drainage conduit having an upper arch in external cross section substantially that of intersecting hyperbolas, the lower exterior of said conduit below the arch having reversely curved side walls to form a lower conduit between adjacent conduits.

7. A hollow drainage conduit having an upper arch in external cross section substantially that of intersecting hyperbolas, upwardly-presented lateral shoulders formed on sides of said arch, and the lower exterior of the conduit below said shoulders having reversely curved side walls, and openings formed through the arch above said shoulders.

8. A hollow drainage conduit having a flat base, the sidewalls of said conduit flaring outwardly from said base and terminating in upwardly-presented lateral shoulders, and the top of said conduit above said shoulders being arched, with openings extending through the top of said conduit.

9. A hollow drainage conduit having a flat base, the sidewalls of said conduit inclining outwardly from said base and terminating in upwardly presented lateral shoulders, the top of said conduit above said shoulders taking the form of a curved arch having the top of the exterior of the arch substantially pointed, and openings formed from the top wall of the conduit.

10. A hollow drainage conduit having a flat base, the sidewalls of said conduit inclining outwardly from said base and terminating in upwardly presented lateral shoulders, the top of said conduit above said shoulders taking the form of a curved arch in cross section with the exterior top of the arch substantially pointed, and openings extending through the top wall of the conduit, and a bottom of the interior of the conduit being rounded.

11. In a drainage bed, a plurality of hollow conduits, arch shaped in cross section, laid side by side, said conduits having formed on their side walls thereof upwardly-presented shoulders, the exterior faces of the walls of the conduit below said shoulders being curved downwardly and inwardly, the shoulder of one conduit flanking the shoulder of the next adjacent conduit to form a supplementary conduit beneath said shoulders, and openings through the top walls of said conduits.

12. In a drainage bed, a plurality of hollow conduits laid side by side, said conduits being arched in cross section and having upwardly-presented shoulders on their sidewalls and the exterior faces of said sidewalls below said shoulders being curved downwardly and inwardly, the shoulder of one conduit flanking that of the next adjacent conduit to form beneath the same a supplementary conduit, and transversely extending openings through the top walls of said conduits, the said openings of the adjacent conduits being arranged in staggered relation.

13. In a drainage bed, a plurality of conduits arranged side by side, each of said conduits being arch shaped in cross section and provided on its sidewalls with upwardly-presented shoulders and the exterior faces of the walls of the conduits below said shoulders being curved downwardly and inwardly, the shoulders of one conduit flanking the shoulders of the adjacent conduit to form beneath the same a supplementary conduit, transversely extending openings through the top wall of said conduits terminating at said shoulders and the conduits being so arranged that the openings of one conduit are staggered relatively to the openings of the next adjacent conduit.

14. In a drainage bed, a plurality of conduits arranged side by side, each conduit being arch shaped in cross section and provided on its sidewalls with upwardly-presented shoulders and the exterior faces of the walls of the conduits below said shoulders being curved downwardly and inwardly, the shoulders of the adjacent conduits arranged to form beneath the same a supplementary conduit with drainage passages between said adjacent shoulders, and openings formed through the top walls of the conduits.

15. A hollow drainage conduit, having an external shape in cross section substantially that of a pointed curved arch and internally substantially egg-shaped with the widest point towards the base of the conduit.

16. A hollow drainage conduit arch-shaped in cross section, having on its opposite sidewalls upwardly presented shoulders and the exterior faces of the walls of the conduit below said shoulders being inclined downwardly and inwardly, and openings through the top walls of the conduit.

17. A hollow drainage conduit having a substantially flat base, the exterior sidewalls of said base inclining outwardly and upwardly and terminating in upwardly presented shoulders, the interior of said arch being substantially egg-shaped in cross section with the widest point at the base of the conduit and the exterior walls of said conduit above said shoulder being arched and terminating in a point.

18. A hollow drainage conduit having a substantially flat base, the exterior walls of said base inclining upwardly and outwardly and terminating in an upwardly presented shoulder, that portion of the conduit above said shoulder having a shape in cross section substantially that of a hyperbola arch outside and a parabola arch inside, said arches diverging toward the top of the conduit and openings formed in that portion of the arch above the shoulders.

19. A hollow drainage conduit having a substantially flat bottom, the side walls of said conduit inclining upwardly and outwardly from said bottom and terminating in upwardly presented shoulders, that portion of the arch above said shoulders forming in cross section substantially a hyperbola on the outside and a parabola on the inside, said arches diverging toward the top of the conduit, and the interior of the conduit below said shoulders being rounded.

20. A hollow drainage conduit having a substantially flat bottom, the side walls of said conduit inclining upwardly and outwardly from the bottom and terminating in upwardly presented shoulders, the side walls of the conduit above said shoulders taking the form of a hyperbola arch and the interior walls of said conduit being substantially curved.

21. A hollow drainage conduit having a substantially flat bottom, the side walls of said conduit inclining upwardly and outwardly from said bottom and terminating in upwardly presented shoulders and the exterior walls of said conduit above said shoulders taking the form of a hyperbola arch.

GRAFTON E. LUCE.